US012452631B2

(12) United States Patent
Liu et al.

(10) Patent No.: US 12,452,631 B2
(45) Date of Patent: Oct. 21, 2025

(54) METHOD FOR ESTABLISHING BROADCAST SERVICE AND NETWORK DEVICE

(71) Applicant: GUANGDONG OPPO MOBILE TELECOMMUNICATIONS CORP., LTD., Guangdong (CN)

(72) Inventors: Jianhua Liu, Guangdong (CN); Haorui Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 431 days.

(21) Appl. No.: 17/849,226

(22) Filed: Jun. 24, 2022

(65) Prior Publication Data

US 2022/0322052 A1   Oct. 6, 2022

Related U.S. Application Data

(63) Continuation of application No. PCT/CN2020/070746, filed on Jan. 7, 2020.

(51) Int. Cl.
*H04W 4/06* (2009.01)
*H04L 12/18* (2006.01)

(52) U.S. Cl.
CPC ............ *H04W 4/06* (2013.01); *H04L 12/189* (2013.01)

(58) Field of Classification Search
None
See application file for complete search history.

(56) References Cited

U.S. PATENT DOCUMENTS

2019/0158985 A1   5/2019  Dao et al.
2021/0058748 A1*  2/2021  Liao ............... H04W 76/11

FOREIGN PATENT DOCUMENTS

| CN | 101459873 A   | 6/2009 |
| CN | 109155909 A   | 1/2019 |
| WO | 2009039772 A1 | 4/2009 |
| WO | 2014017789 A1 | 1/2014 |

(Continued)

OTHER PUBLICATIONS

International Search report and Written Opinion with English Translation for PCT Application PCT/CN2020/070746 mailed Oct. 10, 2020. (12 pages).

(Continued)

*Primary Examiner* — Robert M Morlan
(74) *Attorney, Agent, or Firm* — Young Basile Hanlon & MacFarlane, P.C.

(57) ABSTRACT

Described are a method for establishing a broadcast service, a network device, a chip, a computer readable storage medium, a computer program product, and a computer program, the method includes: a first network device receives a first request carrying information related to a broadcast service, the first request being used for indicating the establishment of a session corresponding to the broadcast service or being used for modifying a session corresponding to the broadcast service; the first network device sends to a second network device a second request carrying the information related to the broadcast service, the second request being used by the second network device for establishing a session corresponding to the broadcast service or modifying a session corresponding to the broadcast service.

10 Claims, 9 Drawing Sheets

(56) References Cited

FOREIGN PATENT DOCUMENTS

| WO | 2019101104 A1 | 5/2019 |
| WO | 2019114939 A1 | 6/2019 |

OTHER PUBLICATIONS

Huawei, HiSilicon, Solution on KI#16: Support of Group Communication and Messaging, SA WG2 Meeting #128, S2-186733, Jul. 2-6, 2018. (5 pages).

Samsung Electronics, Update of Solution 19: CN-initiated UP deactivation support, SA WG2 Meeting #128 bis, S2-188151, Aug. 20-24, 2018. (10 pages).

Huawei, HiSilicon, Telecom Italia, KI#14: Update of Solution #B2, Sa WG2 Meeting #129, S2-1810639, Oct. 15-19, 2018. (18 pages).

3GPP TS 23.246 V15.0.0 (Dec. 2017); Group Services and System Aspects; Multimedia Broadcast/Multicast Service; Architecture and functional description (Release 15). (77 pages).

3GPP TS 23.501 V16.3.0 (Dec. 2019); Technical Specification Group Services and System Aspects; System architecture for the 5G System; Stage 2; (Release 16). (409 pages).

International Search Report with English Translation for PCT/CN2020/070746 mailed Oct. 20, 2020.

Extended European Search Report for EP Application 20912541.8 mailed Dec. 2, 2022. (8 pages).

Chinese First Office Action and English translation for Chinese Patent Application No. 202310681540.X, issued Aug. 16, 2024, 18 pages.

Chinese First Office Action and English translation for Chinese Patent Application No. 202310681540.X, issued Oct. 19, 2024, 17 pages.

European First Examination Report for EP Patent Application No. 20912541.8, issued Aug. 20, 2024, 7 pages.

Chinese Decision of Rejection with English translation for Chinese Patent Application No. 202310681540.X, issued Jan. 7, 2025, 15 pages.

\* cited by examiner

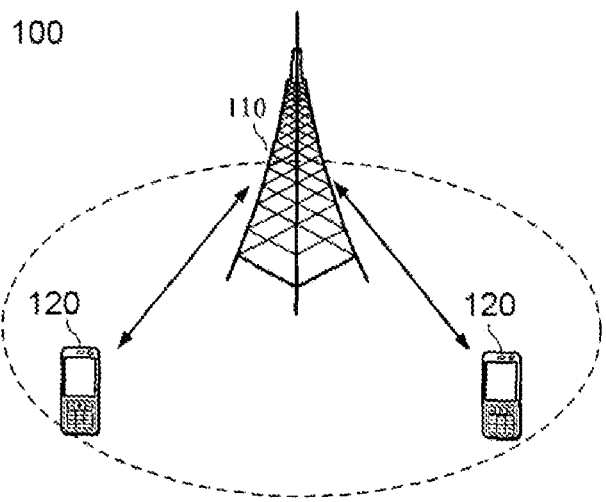

FIG. 1A

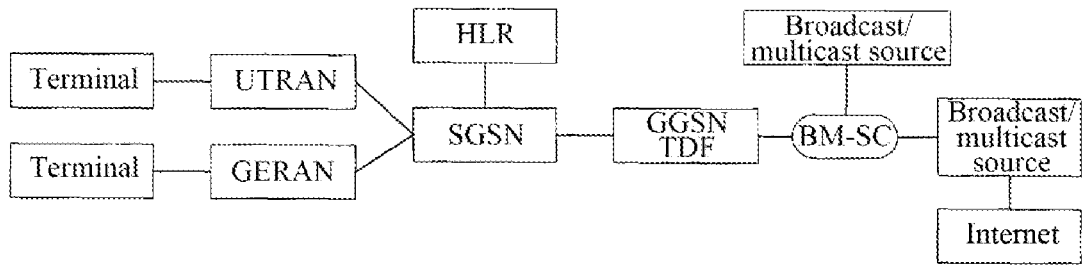

FIG. 1B

| BM-SC sends a session start message to multi-MBMS-GW, wherein the session start message may carry indication information of whether to perform radio resource coordination |
|---|
| MBMS-GW determines whether to perform radio resource coordination according to the indication information in the session start message or network configuration |
| MBMS-GW sends the session message to an e-Node B when it is determined that radio resource coordination is not performed, and the MBMS-GW sends the session message to an MCE when it is determined that radio resource coordination is performed |

FIG. 1C

METHOD FOR ESTABLISHING BROADCAST SERVICE AND NETWORK DEVICE

CROSS-REFERENCE TO RELATED APPLICATION(S)

The present application is a continuation application of International PCT Application No. PCT/CN2020/070746, filed on Jan. 7, 2020, the entire content of which is hereby incorporated by reference.

TECHNICAL FIELD

The present disclosure relates to the technical field of information processing, in particular to a method for establishing broadcast service, a network device, a chip, a computer readable storage medium, a computer program product and a computer program.

BACKGROUND

In LTE, Multimedia Broadcast and Multicast Service (MBMS) mechanism is introduced. In 5G system, broadcast transmission mechanism will be introduced. The network architecture in 5G has changed greatly, and the network side adopts point-to-multipoint transmission mode to transmit downlink data in the broadcast service area. A terminal in this area can receive broadcast data using a broadcast channel. However, due to the change of 5G network architecture and the change of network entities responsible for broadcasting services, the management of broadcasting service sessions has changed. How to control the start and/or modification of broadcasting sessions in the new architecture is a problem that needs to be solved.

SUMMARY

In order to solve the above technical problems, implementations of the present disclosure provide a method for establishing broadcast service, a network device, a chip, a computer readable storage medium, a computer program product and a computer program.

In a first aspect, a method for establishing a broadcast service is provided, including:
 receiving, by a first network device, a first request carrying information related to a broadcast service, wherein the first request is used for indicating to establish a session corresponding to the broadcast service or is used for modifying a session corresponding to the broadcast service;
 sending, by the first network device, a second request carrying the information related to the broadcast service to a second network device, wherein the second request is used by the second network device for establishing a session corresponding to the broadcast service or is used for modifying a session corresponding to the broadcast service.

In a second aspect, a method for starting a broadcast service is provided, including:
 receiving, by a second network device, a second request sent by a first network device carrying information related to a broadcast service, wherein the second request is used by the second network device for establishing a session corresponding to the broadcast service or modifying a session corresponding to the broadcast service; and
 sending, by the second network device, a third request carrying the information related to the broadcast service to a RAN node; wherein, the third request is used for requesting to establish a context corresponding to the broadcast service.

In a third aspect, a method for establishing a broadcast service is provided, including:
 receiving, by a second network device, a first request carrying information related to a broadcast service, wherein the first request is used for establishing a session corresponding to the broadcast service or is used for modifying a session corresponding to the broadcast service; and
 sending, by the second network device, a fifth request carrying the information related to a broadcast service to a Radio Access Network (RAN) node through a first network device, wherein the fifth request is used for requesting the RAN node to establish a context corresponding to the broadcast service.

In a fourth aspect, a method for establishing a broadcast service is provided, including:
 receiving, by a first network device, a fifth request sent by a second network device carrying information related to a broadcast service, wherein the fifth request is used for requesting the RAN node to establish a context corresponding to the broadcast service; and
 sending, by the first network device, the fifth request to the RAN node.

In a fifth aspect, a method for establishing a broadcast service is provided, including:
 sending, by a third network device, a first request carrying information related to a broadcast service to a first network device or a second network device, wherein the first request is used for establishing a session corresponding to the broadcast service or is used for modifying a session corresponding to the broadcast service.

In a sixth aspect, a first network device is provided, including:
 a first communication unit, configured to receive a first request carrying information related to a broadcast service, wherein the first request is used for indicating to establish a session corresponding to the broadcast service or is used for modifying a session corresponding to the broadcast service; and send a second request carrying the information related to the broadcast service to a second network device, wherein the second request is used by the second network device for establishing a session corresponding to the broadcast service or is used for modifying a session corresponding to the broadcast service.

In a seventh aspect, a second network device is provided, including:
 a second communication unit, configured to receive a second request carrying information related to the broadcast service sent by a first network device, wherein the second request is used by the second network device for establishing a session corresponding to the broadcast service or modifying a session corresponding to the broadcast service; and send a third request carrying information related to the broadcast service to a RAN node, wherein, the third request is used for requesting to establish a context corresponding to the broadcast service.

In an eighth aspect, a second network device is provided, including:
- a second communication unit, configured to receive a first request carrying information related to a broadcast service, wherein the first request is used for establishing a session corresponding to the broadcast service or is used for modifying a session corresponding to the broadcast service; and send a fifth request carrying the information related to the broadcast service to a Radio Access Network (RAN) node through a first network device, wherein the fifth request is used for requesting the RAN node to establish a context corresponding to the broadcast service.

In a ninth aspect, a first network device is provided, including:
- a first communication unit, configured to receive a fifth request carrying information related to a broadcast service sent by a second network device, wherein the fifth request is used for requesting the RAN node to establish a context corresponding to the broadcast service; and send the fifth request to the RAN node.

In a tenth aspect, a third network device is provided, including:
- a third communication unit, configured to send a first request carrying information related to a broadcast service to a first network device or a second network device, wherein the first request is used for establishing a session corresponding to the broadcast service or is used for modifying a session corresponding to the broadcast service.

In an eleventh aspect, a network device is provided, including a processor and a memory. The memory is configured to store a computer program, and the processor is configured to call and run the computer program stored in the memory to perform the method in any one of the first to fifth aspects described above or various implementations thereof.

In a twelfth aspect, there is provided a chip used for implementing the methods according to the first to fifth aspects described above or various implementations thereof.

Specifically, the chip includes a processor configured to call and run a computer program from a memory to enable a device in which the chip is installed to perform the method according to any one of the first to fifth aspects or any of various implementation modes thereof.

In a thirteenth aspect, there is provided a computer readable storage medium for storing a computer program that causes a computer to perform the methods according to the first to fifth aspects described above or various implementations thereof.

In a fourteenth aspect, there is provided a computer program product including computer program instructions that cause a computer to perform the methods according to the first to fifth aspects described above or various implementations thereof.

In a fifteenth aspect, there is provided a computer program, which, when running on a computer, causes the computer to perform the methods according to the first to fifth aspects described above or various implementations thereof.

By adopting the above solution, a first network device and a second network device may request a RAN node to establish an N3 channel downlink data receiving address corresponding to the broadcast service when the broadcast service needs to be established. In this way, the control of the start and/or modification of broadcast sessions in the new network architecture is achieved.

BRIEF DESCRIPTION OF DRAWINGS

FIG. 1A is a schematic diagram of a composition of communication architecture.

FIG. 1B is a schematic diagram of a composition of a network.

FIG. 1C is a schematic sequence char of a broadcast service.

DETAILED DESCRIPTION

To understand features and technical contents of implementations of the present disclosure in more detail, realizations of the implementations of the present disclosure will be described in detail below with reference to the drawings, which are used for reference only but are not intended to limit the implementations of the present disclosure.

Technical solutions in implementations of the present disclosure will be described below with reference to the drawings in the implementations of the present disclosure. It is apparent that the implementations described are just a part of implementations of the present disclosure, but not all of the implementations of the present disclosure. According to the implementations of the present disclosure, all other implementations achieved by a person of ordinary skill in the art without making inventive efforts belong to the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1D:
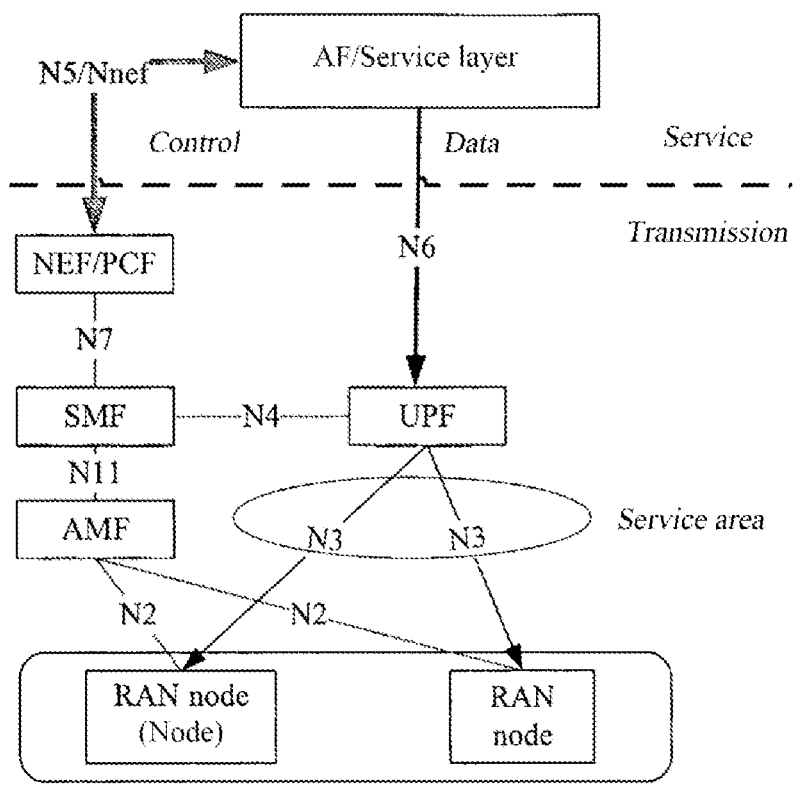
FIG. 1D is a schematic diagram of a broadcast service architecture.

Illustratively, a communication system 100 to which an implementation of the present disclosure may be applied is as shown in FIG. 1A. The communication system 100 may include a network device 110, wherein the network device 110 may be a device that communicates with a UE 120 (or referred to as a communication terminal device, or a terminal device). The network device 110 may provide communication coverage for a specific geographical area, and may communicate with UE located within the coverage area.

Optionally, the network device 110 may be a network device (Base Transceiver Station (BTS)) in a GSM system or CDMA system, a network device (NodeB (NB)) in a WCDMA system, an Evolutional network device (Evolutional Node B (eNB or eNodeB)) in a LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 further includes at least one UE 120 located within the coverage range of the network device 110. As used herein, the term "UE" includes, but is not limited to, a device configured to connect via a wired circuit, for example, via a Public Switched Telephone Network (PSTN), a Digital Subscriber Line (DSL), a digital cable, a direct cable; and/or via another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or via another UE, and configured to receive/send a communication signal; and/or an Internet of Things (IoT) device. An UE configured to communicate via a wireless interface may be referred to as a "wireless communication terminal device", a "wireless terminal device" or a "mobile terminal device".

Optionally, a Device to Device (D2D) communication may be performed between the UEs 120.

In LTE, Multimedia Broadcast and Multicast Service (MBMS) mechanism is introduced, and the details are shown in 1B. In order to support the transmission of MBMS user plane and control plane, a new MAC-m functional entity is added in Control the Radio Network Controller (CRNC) in Media Access Control (MAC) layer, which is responsible for the MBMS transmission channel. In order to carry out MBMS P-T-M transmission, three new logic channels are added: Multipoint Control Channel (MCCH), Multipoint Scheduling Channel (MSCH) and Multipoint Traffic Channel (MTCH), which are used for P-T-M transmission of downlink user information and control information. A dedicated Paging Indication Channel (MICH) is further defined for paging users who customize an MBMS service.

In order to achieve the effective distribution of data packets, the functions of the following four existing functional entities in the core network are expanded.

(1) A corresponding MBMS function and signaling interaction process are added to the UE (terminal), so that the UE supports activation/deactivation of an MBMS carrier service, and supports security functions related to MBMS, such as encryption and consistency protection of content, capable of receiving MBMS service declaration, paging message or supporting synchronous service, and deciding whether to ignore an MBMS session according to an MBMS session flag.

(2) GSM EDGE Radio Access Network/UMTS Terrestrial Radio Access Network (GERAN/UTRAN) is enabled to transmit the MBMS service in a predetermined MBMS service area. In a multicast mode, an appropriate radio carrier mode is selected according to the current service user data and available radio resources in the cell, support the core network to initiate and terminate the MBMS service transmission, allow an MBMS receiver to move between GSM EDGE Radio Access Network (GERAN) and UMTS Terrestrial Radio Access Network (UTRAN), and transmit declaration and paging information while carrying out the MBMS service.

(3) SGSN conducts network control over the MBMS carrier service, supports the MBMS receiver to move between SGSN, supports multicast service charging, including post-paid and prepaid users, and simultaneously establishes or releases Iu carrier and Gn carrier according to the notification sent by GGSN.

(4) Gateway GPRS Support Node (GGSN)/Traffic Plane Function (TDF) is used as an IP multicast service node of MBMS data. According to the notification request of Broadcast Multicast Service Center (BM-SC), the user plane carrier is established or released for broadcast or multicast transmission, and IP multicast content is received from BM-SC or other data sources and transmitted to an appropriate General Data Transmission Platform (GTP) tunnel, supporting message notification and collecting charging data information. The network architecture of MBMS in 3GPP is shown in the following figure.

Figure 2:
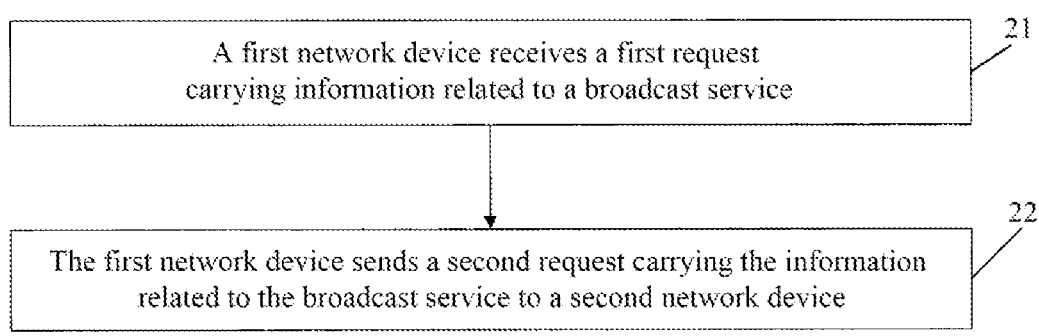
FIGS. 2 to 10 are various schematic diagrams of processing flows of the method for establishing a broadcast service according to an implementation of the present disclosure.
Figure 3:
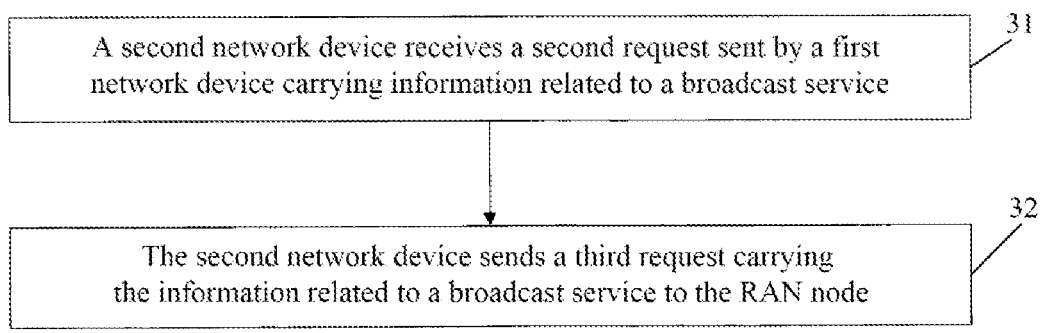

The process flow is shown in FIGS. 1-3, which may include: BM-SC sends a session start message to multiMedia Broadcast/Multicast Service GateWay (multi-MBMS-GW), wherein the session start message may carry indication information of whether to perform radio resource coordination; MBMS-GW determines whether to carry out radio resource coordination according to the indication information in the session start message or network configuration; MBMS-GW sends the session message to the e-Node B when it is determined that radio resource coordination is not performed, and the MBMS-GW sends the session message to the Multimedia Broadcast/Multicast Service Coordination Entity (MCE) when it is determined that radio resource coordination is performed. The indication information may be set by default. When the indication information is carried, it indicates that the radio resource coordination is performed or the radio resource coordination is not performed. The indication information may also indicate whether the radio resource coordination is performed through different values respectively. In addition, the MBMS-GW assigns user interface resources and IP multicast addresses before sending the session start message. Thus, the MBMS-GW includes the IP multicast address into the session start message it sends.

In a 5G system, a broadcast transmission mechanism will be introduced. The network architecture in 5G has changed greatly, as shown in FIGS. 1-4, and the network side adopts point-to-multipoint transmission mode to transmit downlink data in the broadcast service area. A terminal in this area can receive broadcast data using a broadcast channel.

Due to the change of 5G network architecture and the change of network entities responsible for broadcasting services, the management of broadcasting service sessions has changed.

It should be understood that the terms "system" and "network" may often be used interchangeably herein. The term "and/or" herein is an association relation describing associated objects only, indicating that three relations may exist, for example, A and/or B may indicate three cases: A alone, both A and B, and B alone. In addition, the symbol "I" in this document generally indicates that objects before and after the symbol "I" have an "or" relationship.

To understand features and technical contents of implementations of the present disclosure in more detail, realizations of the implementations of the present disclosure will be described in detail below with reference to the drawings, which are used for reference only but are not intended to limit the implementations of the present disclosure.

As shown in FIG. 2, a method for establishing a broadcast service is provided in an implementation, which includes the following acts.

In act 21, a first network device receives a first request carrying information related to a broadcast service, wherein the first request is used for indicating to establish a session corresponding to the broadcast service or is used for modifying a session corresponding to the broadcast service.

In act 22, the first network device sends a second request carrying the information related to the broadcast service to a second network device, wherein the second request is used by the second network device for establishing a session corresponding to the broadcast service or is used for modifying a session corresponding to the broadcast service.

A method for starting a broadcast service provided on a second network device side, as shown in FIG. 3, which includes the following acts.

In act 31, a second network device receives a second request sent by a first network device carrying information related to a broadcast service, wherein the second request is used by the second network device for establishing a session corresponding to the broadcast service through an evolved universal terrestrial Radio Access Network (RAN) or modifying a session corresponding to the broadcast service.

In act 32: the second network device sends a third request carrying the information related to a broadcast service to the RAN node, wherein, the third request is used for requesting to establish a context corresponding to the broadcast service.

Figure 4:
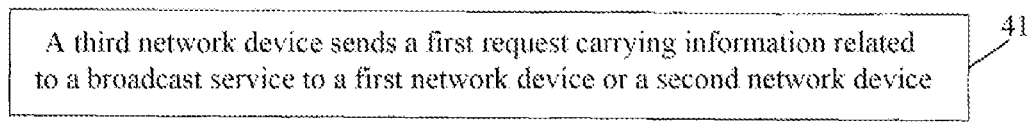

Accordingly, as shown in FIG. 4, a method for establishing a broadcast service corresponding to a third network device includes the following acts.

In act 41, a third network device sends a first request carrying information related to a broadcast service to a first network device or a second network device, wherein the first request is used for establishing a session corresponding to the broadcast service or is used for modifying a session corresponding to the broadcast service.

In an implementation, the first network device may be an Access and Mobility Management Function (AMF), the second network device may be a Session Management Function (SMF), the third network device may be a Policy Control Function (PCF), and the fourth network device may be a User Plane Function (UPF).

Of course, the third network device may be another device as long as it can accept instructions from a third party application service AF to initiate the broadcast service and can send a first request to the first network device or the second network device to establish or modify a session corresponding to the broadcast service, i.e., it is within the protection scope of the solution provided by the present implementation. In addition, the fourth network device is not limited to a UPF.

Generally speaking, the solution provided by this implementation is that the MBS session is started by a network side. The network side determines the related information of the area and the session of the broadcast service, and notifies to the RAN side. A first network device (e.g. an AMF) is first selected through a third network device (e.g. a PCF), and a corresponding second network device, i.e. an SMF network entity, is selected through the first network device, i.e. an AMF.

Wherein, the information related to a broadcast service includes at least one of the following: identification information of the broadcast service, area information of the broadcast service, quality requirement information of the broadcast service, group information of data corresponding to the broadcast service, Data Network Name (DNN) information corresponding to the broadcast service, and network slice information corresponding to the broadcast service.

Figure 5:
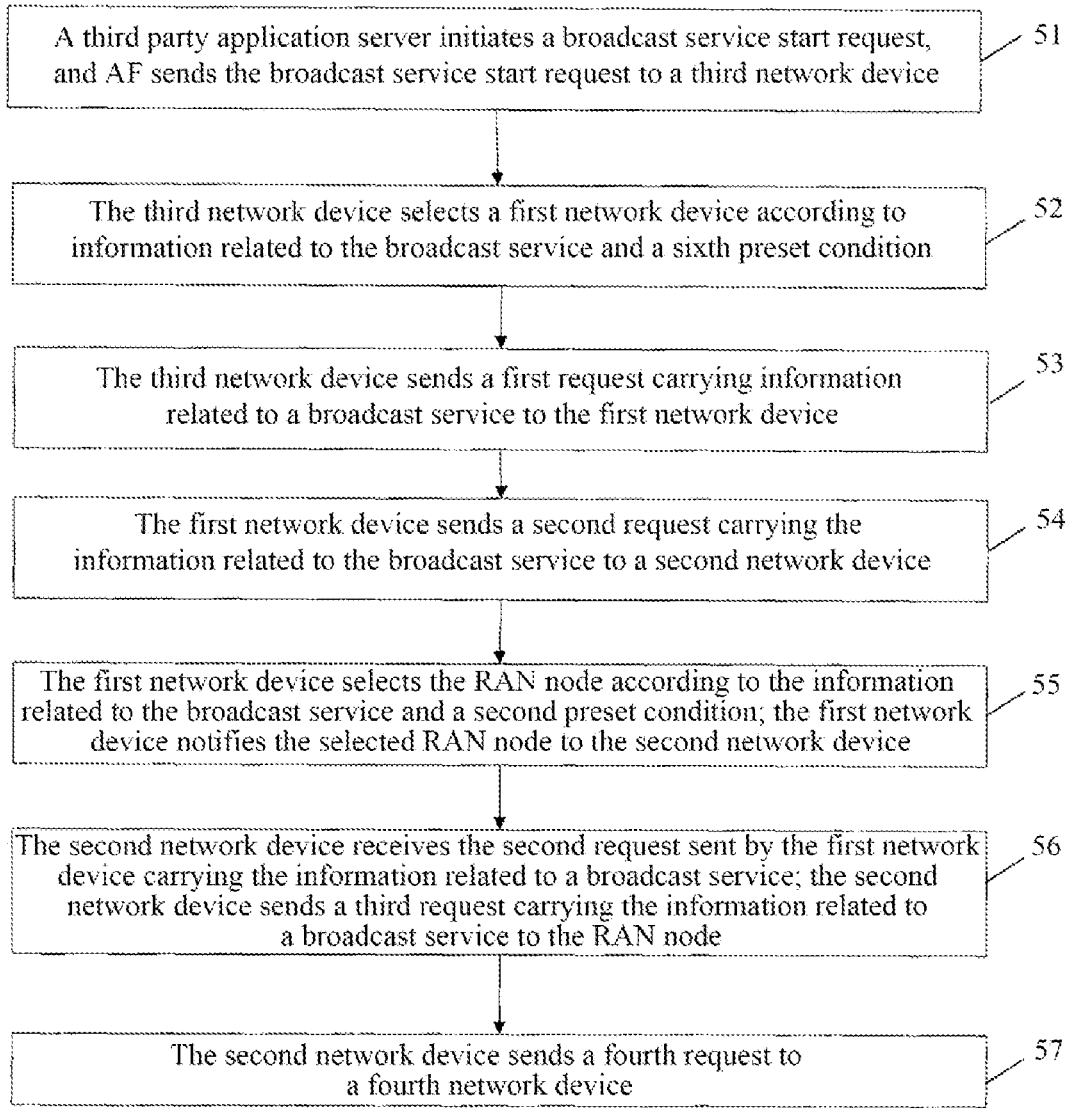

Below, a solution provided by an implementation of the present disclosure will be described specifically in combination with FIG. 5.

In act 51, a third party application server (AF) initiates a broadcast service start request, and the AF sends the broadcast service start request to a third network device.

Correspondingly, the third network device receives a broadcast service start request carrying the information related to the broadcast service sent by the third party application server.

Specifically, for example, the third network device is a PCF, the AF may directly send the broadcast service start request to the PCF entity.

Alternatively, the AF may forward the broadcast service start request to the PCF entity through the Network Explosion Function (NEF).

Alternatively, the AF may forward the broadcast service start request to the PCF entity through the Unified Data Management (UDM) or the Unified Data Repository (UDR).

The broadcast service start request may carry the information related to the broadcast service, including at least one of the following: identification information of the broadcast service, area information of the broadcast service, quality requirement information of the broadcast service, group information of data corresponding to the broadcast service, DNN information corresponding to the broadcast service, and network slice information corresponding to the broadcast service.

Specifically, the area information of the broadcast service may mainly include regional information and geographical location information; the regional information may include information of, for example, a country/province/city/district or may be understood as a receiving area of the broadcast service.

Quality requirement information of the broadcast service is a maximum data rate, a data rate to be guaranteed, a delay requirement of data transmission, etc.

In act 52, the third network device selects a first network device (or a second network device) according to the information related to the broadcast service and a sixth preset condition.

The sixth preset condition includes at least one of the following:
- a first network device or a second network device corresponding to the area information of the broadcast service is selected;
- a first network device or a second network device corresponding to the identification information of the broadcast service is selected based on a correspondence relationship between the broadcast service and a configured network entity;
- a first network device or a second network device corresponding to the group information of the broadcast service is selected;
- a first network device or a second network device capable of supporting the quality requirement information of the broadcast service is selected; and
- a first network device or a second network device capable of supporting DNN information and/or network slice information of the broadcast service is selected.

Specifically, after receiving the broadcast service start request, the PCF determines a related network entity (or network device) according to the information related to the broadcast service carried in the broadcast service start request and the sixth preset condition.

The related network entity may be a first network device and/or a second network device, that is, the corresponding AMF or SMF selected by the PCF.

The details may be as follows.

According to the area information of the broadcast service (or the receiving area information of the broadcast service), the network entity related to the broadcast service is determined, including SMF/AMF and the like. For example, if the desired broadcast service area is a certain geographic area, the PCF determines the corresponding SMF/AMF information according to the geographic area and the local configuration information. The area information may be an area corresponding to a broadcast service or area information corresponding to a specific group.

According to the received service information, such as the identification information of the service, the related network entity is determined, including SMF/AMF or the like. The PCF determines the related network entity according to the relationship between the pre-configured broadcast service and the configured network entity (i.e. the correspondence relationship with the broadcast service area).

The broadcast area is determined according to the information of the group corresponding to the broadcast service, and the related network entities include SMF/AMF and the like. The PCF may determine the network entity corresponding to the broadcast group according to the information of the broadcast group locally configured and the correspondence relationship with the service area or the corresponding network entity. In other words, the third network device (PCF) may pre-configure a correspondence relationship between a broadcast service area and a network entity, and determines a selected SMF or AMF entity based on the correspondence relationship between the broadcast area and the network entity after determining the corresponding broadcast area based on group information of the broadcast service.

According to the service quality requirement information, such as service quality requirement provided by a third party, the area information that can support the service requirement is determined. For example, if the latency requirement that can be reached is 100 ms, the network entity that can support 100 ms is selected as the broadcast or multicast entity.

DNN information and/or network slice information corresponding to the broadcast service is used for determination. Specifically, it may be understood as that the SMF or AMF capable of supporting DNN information and/or network slice information of the broadcast service selected.

In act 53, a third network device sends a first request carrying information related to a broadcast service to a first network device; wherein the first request is used for establishing a session corresponding to the broadcast service or is used for modifying a session corresponding to the broadcast service.

That is, the PCF sends a first request to the selected AMF, a first request can be a session establishment request.

In the first request (i.e. the session establishment request), the information related to a broadcast service that can be carried may include at least one of the following: service information (such as service type, service identification, etc.), QoS requirement information, group information, etc.

In act 54, the first network device sends a second request carrying the information related to the broadcast service to a second network device, wherein the second request is used by the second network device for establishing a session corresponding to the broadcast service or modifying a session corresponding to the broadcast service.

That is, after determining the SMF, the AMF sends a session establishment or modification message to the selected SMF, which carries service information, QoS requirement information, group information, DNN and/or network slice information, etc.

It should be pointed out that if a related network entity determined by PCF in act 52 only includes an AMF (i.e., the first network device), the first network device then selects a corresponding second network device (i.e., an SMF) according to the information related to the broadcast service and a first preset condition.

The first preset condition includes at least one of:
the second network device corresponding to the area information of the broadcast service is selected;
the second network device corresponding to the identification information of the broadcast service is selected based on the correspondence relationship between the broadcast service and a configured network entity;
the second network device corresponding to the group information of the broadcast service is selected;
the second network device capable of supporting the quality requirement information of the broadcast service is selected; and
the second network device capable of supporting DNN information and/or network slice information of the broadcast service is selected.

The specific processing of the first preset condition is the same as the specific processing in act 52 and will not be described here.

Or, the third network device (i.e. PCF) may directly select the SMF, i.e. the second network device, then the first network device may receive the indication information corresponding to the second network device from the third network device. That is, the PCF may indicate to the AMF an entity related to the selected broadcast service. A specific way may be as the way of determining AMF/SMF network entities by the PCF.

Specifically, if the second request carries DNN information and/or network slice information, the AMF needs to consider the DNN and/or the network slice information corresponding to the broadcast service when selecting the SMF.

In act 55, the first network device selects the RAN node according to the information related to the broadcast service and a second preset condition.

In addition, optionally, the act may further include: the first network device notifies the selected RAN node to the second network device.

That is, the AMF determines the RAN node related to the broadcast service and sends the RAN node information to the SMF.

Here, the specific second preset condition may include at least one of the following:
the RAN node corresponding to the area information of the broadcast service is selected;
the RAN node corresponding to the identification information of the broadcast service is selected according to the correspondence relationship between the broadcast service and a configured network entity;
the RAN node corresponding to the group information of the broadcast service is selected;
the RAN node capable of supporting the quality requirement information of the broadcast service is selected; and the RAN node capable of supporting DNN information and/or network slice information of the broadcast service is selected.

The aforementioned second preset condition will not be repeated here.

Further, the first network device may send a third request to the second network device, correspondingly it may include that the second network device assigns the N3 channel downlink data receiving address corresponding to the broadcast service based on the third request. That is, in this act, the downlink data receiving address may be assigned by the second network device.

In act 56, the second network device receives the second request sent by the first network device carrying the information related to a broadcast service; the second network device sends a third request carrying the information related to a broadcast service to the RAN node. Wherein, the third request is used for requesting to establish the context corresponding to the broadcast service.

The context corresponding to the broadcast service includes at least one of the following:
an N3 channel downlink data receiving address and Quality of Service (QoS) parameter information.

In this act, the second network device selects the RAN node and/or a fourth network device according to the information related to the broadcast service and a third preset condition; alternatively, the second network device receives the selected RAN node sent from the first network device.

That is, the second network device may select a RAN and/or a fourth network device according to the preset third condition; or, the RAN node selected by the first network device may be received from the first network device.

It is to be understood that if the first network device sends its selected RAN node, the second network device also performs the process of selecting the UPF because there is no interface between the first network device and the fourth network device. If the first network device does not send the selected RAN node to the second network device, the second network device selects the RAN node and the fourth network device according to a third preset condition.

The third preset condition includes at least one of the following:
the RAN node and/or the fourth network device corresponding to the area information of the broadcast service is selected;
the RAN node and/or the fourth network device corresponding to the identification information of the broadcast service is selected based on the correspondence relationship between the broadcast service and a configured network entity;
the RAN node and/or the fourth network device corresponding to the group information of the broadcast service is selected;
the RAN node and/or the fourth network device capable of supporting the quality requirement information of the broadcast service is selected; and
the RAN node and/or the fourth network device capable of supporting DNN information and/or network slice information of the broadcast service is selected.

Specifically, the SMF selects a suitable RAN node and a fourth network device based on the received service information, group information, QoS, DNN and/or network slice information, etc.

The SMF then sends a broadcast session establishment/modification request to the RAN node, which carries broadcast service information, group information, slice information, QoS information and the like.

The detailed description of each condition in the aforementioned third preset condition is the same as that in the aforementioned act, except for that the selected object is different from that in the aforementioned preset condition, so it will not be repeated here.

Accordingly, this act may further include:

After receiving the request, if the broadcast service information can be supported, the RAN node assigns the downlink data receiving address of the N3 channel for the broadcast service and responds to the SMF, which carries the downlink data receiving address.

Different from the preceding act 55, the second network device notifies the RAN node in this act, and then the RAN node assigns the context corresponding to the broadcast service, including assigning the downlink data receiving address of the N3 channel.

In act 57, the second network device sends a fourth request to the fourth network device, wherein the fourth request is used for requesting the fourth network device to carry out QoS processing on the downlink data corresponding to the broadcast service.

It should be noted that act 57 and act 56 may be executed in no particular order, and act 57 may be executed first and then act 56, or act 57 and act 56 may be executed simultaneously, or act 56 may be executed first and then act 5, the execution order may be set according to the actual situation, and it will not be repeated here.

The second network device sends the N3 channel downlink data receiving address of the broadcast service to the fourth network device. It should be understood here that if the second network device sends the corresponding N3 channel downlink data receiving address to the fourth network device, it may be the N3 channel downlink data receiving address assigned by SMF when executing act 54. This act is then performed to send the address to the selected fourth network device.

Or, if it is an address assigned by the RAN, the act 57 needs to be executed after the act 56, that is, after the second network device receives the N3 channel downlink data receiving address for the broadcast service fed back by the RAN, it forwards the N3 channel downlink data receiving address for the broadcast service to the fourth network device.

In other words, the SMF sends a session establishment/modification request to the selected UPF, which may carry service information, group information, QoS, DNN and/or network slice information and N3 channel information assigned by all relevant RAN nodes, including downlink receiving address information of the channel.

Correspondingly, the act may further include: the fourth network device carries out QoS processing on the downlink data according to the QoS information carried therein, and transmits the broadcast service to the corresponding N3 channel.

In this implementation, the establishment and modification process of the broadcast session may be initiated by the PCF, AMF or SMF actively.

It should be pointed out that there may be one or more final selected RANs in this implementation, if there is one RAN node, then broadcast services are transmitted to a plurality of terminals through one RAN node; if there are a plurality of RANs, the data of broadcast service is respectively transmitted to a plurality of terminals through the plurality of RANs.

Figure 6:
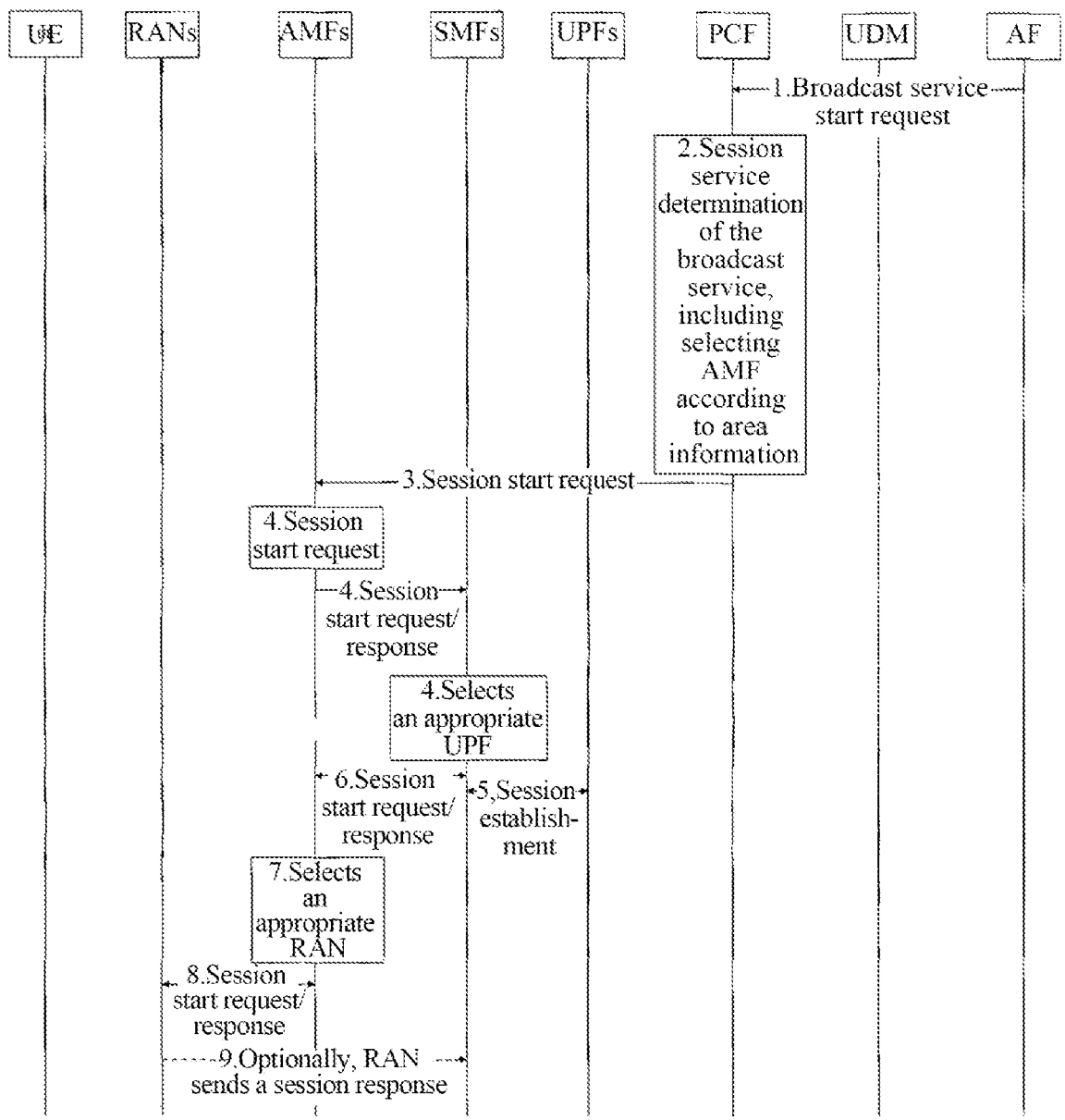

One example is shown in FIG. 6, which includes: 1) a third-party server (AF) sends a broadcast service start request to the PCF; 2) PCF determines a session service according to information related to the broadcast service, which includes selecting AMF according to area information; 3) the PCF sends a session start request to the selected AMF; 4) AMF performs session service determination processing, including SMF selection and sends a session start request/response to the selected SMF, and after receiving the request, the SMF selects an appropriate UPF; 5) SMF sends a session establishment request to UPF; 6) SMF sends session establishment request/response to AMF, which may carry information related to the broadcast service; 7) AMF selects the appropriate RAN after receiving the request; 8) AMF sends the session start request/response to the RAN, with the N3 channel downlink data transmission address for performing the broadcast service by the RAN; 9) (optional), the RAN sends a session response to the AMF.

Figure 7:
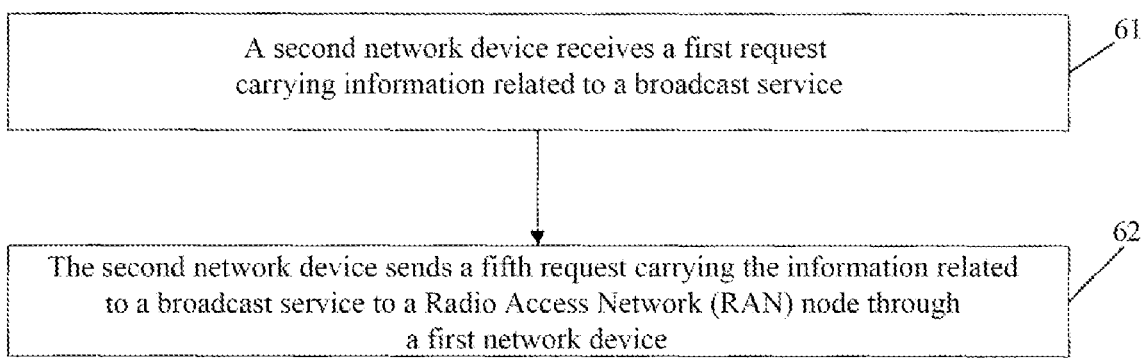

An implementation of the present disclosure further provides a method for establishing a broadcast service, as shown in FIG. 7, including following acts.

In act 61, a second network device receives a first request carrying information related to a broadcast service, wherein the first request is used for establishing a session corresponding to the broadcast service or is used for modifying a session corresponding to the broadcast service.

In act 62, the second network device sends a fifth request carrying the information related to a broadcast service to a Radio Access Network (RAN) node through a first network device; wherein the fifth request is used for requesting the RAN node to establish a context corresponding to the broadcast service.

Figure 8:
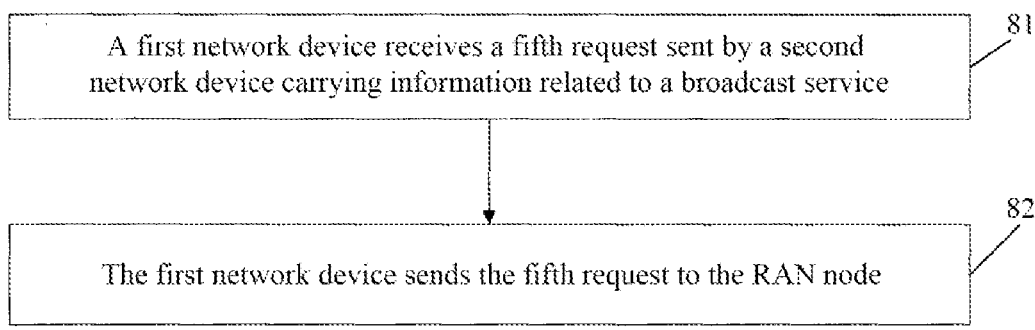

An implementation of the present disclosure further provides a method for establishing a broadcast service, as shown in FIG. 8, including following acts.

In act 81, a first network device receives a fifth request sent by a second network device carrying information related to a broadcast service; wherein the fifth request is used for requesting a RAN node to establish a context corresponding to the broadcast service.

In act 82, the first network device sends the fifth request to the RAN node.

Accordingly, as shown in FIG. 4, a method for establishing a broadcast service corresponding to a third network device includes the following act.

In act 41, a third network device sends a first request carrying information related to a broadcast service to a first network device or a second network device; wherein the first request is used for establishing a session corresponding to the broadcast service or is used for modifying a session corresponding to the broadcast service.

The present implementation differs from the previous implementation in that a third network device directly selects a second network device, that is, the PCF directly selects the SMF in the MBS session start/modification process. The MBS session is started by the network side. The network side determines information related to the area and the session of the broadcast service, and notifies the RAN side. PCF selects an SMF network entity.

The context corresponding to the broadcast service includes at least one of the following: an N3 channel downlink data receiving address and Quality of Service (QoS) parameter information.

In addition, the information related to the broadcast service is the same as that of the previous implementation, and will not be described here.

Figure 9:
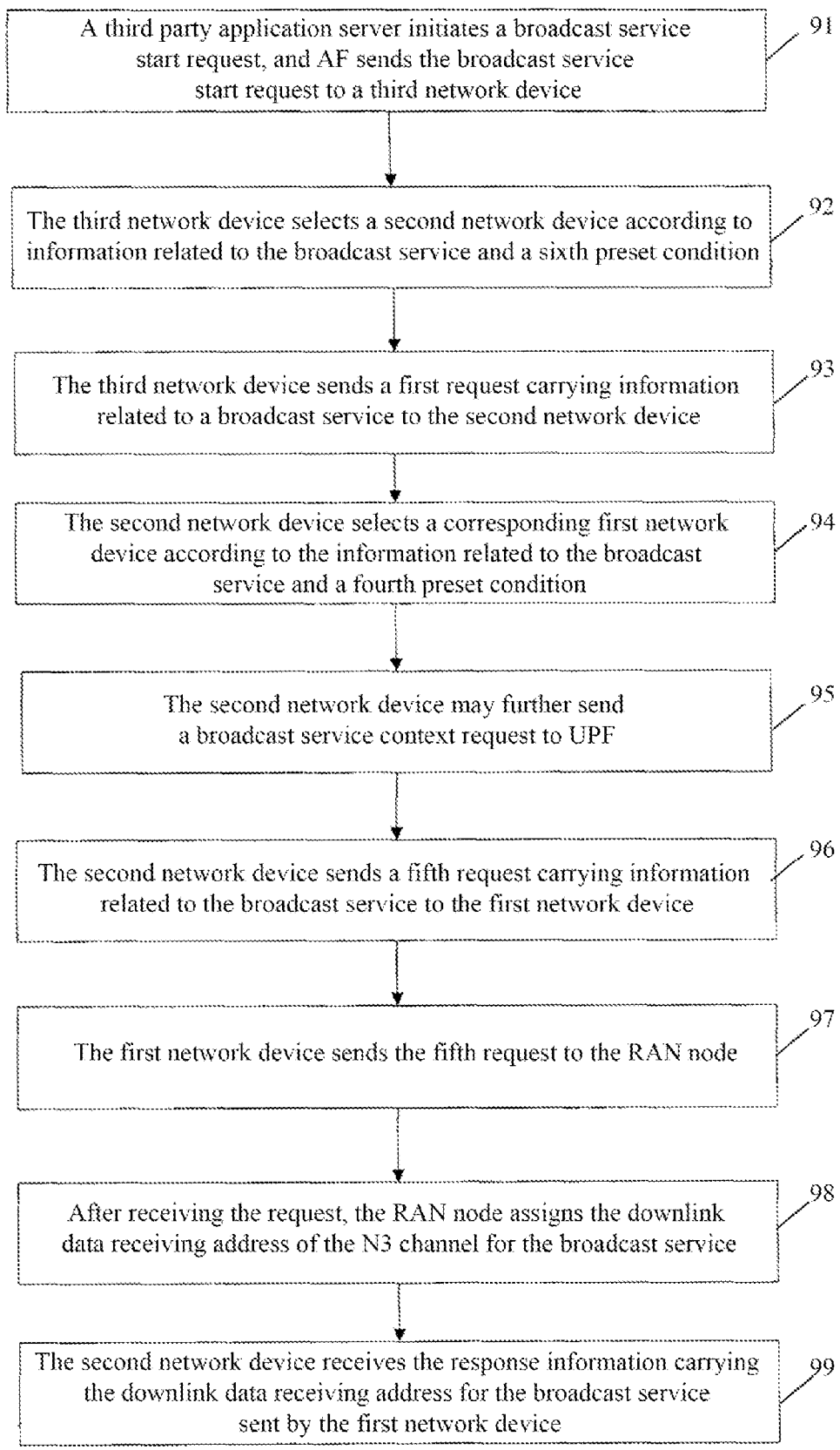

Below, solutions provided by the present implementation of the present disclosure will be described in combination with FIG. 9.

Acts 91 and 92 are the same as acts 51 and 52, except for that in act 92, the third network device selects a second network device according to the information related to the broadcast service and a sixth preset condition.

The difference is that the present implementation focuses on that a third network device (i.e. PCF) can select a second network device (i.e. SMF).

In act 93, the third network device sends a first request carrying information related to a broadcast service to the second network device; wherein the first request is used for establishing a session corresponding to the broadcast service or is used for modifying a session corresponding to the broadcast service.

Accordingly, the second network device receives the first request carrying the information related to the broadcast service.

That is, the PCF (third network device) initiates a first request to the SMF (second network device) for requesting a session establishment, the first request may carry service information, QoS request information, group information, DNN and/or network slice information, etc.

In act 94, the second network device selects a corresponding first network device according to the information related to the broadcast service and a fourth preset condition.

The fourth preset condition includes at least one of the following:

the first network device corresponding to the area information of the broadcast service is selected;

the first network device corresponding to the identification information of the broadcast service is selected based on a correspondence relationship between the broadcast service and a configured network entity;

the first network device corresponding to the group information of the broadcast service is selected;

the first network device capable of supporting the quality requirement information of the broadcast service is selected; and the first network device capable of supporting DNN information and/or network slice information of the broadcast service is selected.

That is, if the AMF is not determined, the SMF may determine the related AMF entity based on the information carried in the session establishment request (i.e. the first request). A specific way of the determination is the same as the way of determining an SMF network entity by PCF, and will not be repeated here.

Further, the act may further include: the second network device selects the RAN node and/or a fourth network device according to the information related to the broadcast service and a third preset condition; and the second network device notifies the selected RAN node and/or the fourth network device to the first network device.

The third preset condition includes at least one of the following:

the RAN node and/or the fourth network device corresponding to the area information of the broadcast service is selected;

the RAN node and/or the fourth network device corresponding to the identification information of the broadcast service is selected based on a correspondence relationship between the broadcast service and a configured network entity;

the RAN node and/or the fourth network device corresponding to the group information of the broadcast service is selected;

the RAN node and/or the fourth network device capable of supporting the quality requirement information of the broadcast service is selected; and the RAN node and/or the fourth network device capable of supporting DNN information and/or network slice information of the broadcast service is selected.

That is to say, the SMF determines the RAN node related to the broadcast service, the way of the determination is similar to the way of the aforementioned determination based on various preset conditions, and will not be described here. The SMF then sends this RAN node information to the AMF. The SMF may also determine the related AMF entity and/or the UPF entity according to the information carried in the received request information. Optionally, SMF selects the corresponding RAN network node.

In addition, in this act, the SMF may also determine the UPF related to the broadcast service.

In act 95, the second network device sends the Quality of Service (QoS) information corresponding to the broadcast service to the fourth network device. In a case that the SMF (i.e. the second network device) selects a fourth network device, the second network device may also send a broadcast service context request to the fourth network device, which carries QoS requirements, DNN information, etc. of the broadcast service.

The second network device sends a fifth request carrying the information related to the broadcast service to a radio access network (RAN) node through the first network device; wherein the fifth request is used for requesting the RAN node to assign the N3 channel downlink data receiving address corresponding to the broadcast service.

In act 96, the second network device sends the fifth request carrying information related to the broadcast service to the first network device.

In addition, when the first network device receives the fifth request, the first network device receives the information of the RAN node and/or the fourth network device sent by the second network device; or, the first network device selects the corresponding RAN node according to the information related to the broadcast service and a fifth preset condition.

The fifth preset condition includes at least one of the following:

the RAN node corresponding to the area information of the broadcast service is selected;

the RAN node corresponding to the identification information of the broadcast service is selected according to a correspondence relationship between the broadcast service and a configured network entity;

the RAN node corresponding to the group information of the broadcast service is selected;

the RAN node capable of supporting the quality requirement information of the broadcast service is selected; and the RAN node capable of supporting DNN information and/or network slice information of the broadcast service is selected.

Specifically, the second network device first sends a fifth request to the first network device. At this time, the first network device may directly transmit the fifth request to the RAN node transparently. In this case, the second network device may also send the selected RAN node to the first network device, and the information may be carried in the fifth request.

In a case that the second network device does not send the selected RAN node to the first network device, the first network device may also select a RAN node according to the information related to the service and the fifth preset condition. The fifth preset condition is as described above, and the specific processing mode for each condition is the same as that of the foregoing implementation, except for that the selected object may be different, so it will not be described here.

Specifically, after determining the AMF, the SMF sends a session establishment or modification message to the selected SMF, which carries service information, QoS requirement information, group information, DNN and/or network slice information, etc. If DNN information and/or network slice information is carried therein, the SMF needs to consider the DNN and/or the network slice information corresponding to the broadcast service when selecting the AMF.

Further, if the SMF determines the RAN node related to the broadcast service, the RAN node information may be sent to the AMF.

In act 97, the first network device sends the fifth request to the RAN node.

That is, the AMF sends a broadcast session establishment/modification request to the RAN node.

It should be noted that if the RAN node and/or UPF are not selected and the SMF does not notify the AMF, the AMF may select the RAN node according to the information related to the broadcast service contained in the received information (i.e. the fifth request carrying the information related to the broadcast service) and the fifth preset condition. Then the corresponding RAN node is determined.

In act 98, after receiving the request, if the broadcast service information can be supported, the RAN node assigns the downlink data receiving address of the N3 channel for the broadcast service and responds to the AMF (i.e. the first network device), which carries the downlink data receiving address. That is to say, the first network device receives the response information carrying the downlink data receiving address for the broadcast service sent by the RAN. Or, the first network device receives the response information of the downlink data receiving address of the broadcast service transmitted by the RAN node through the second network device transparently.

In act 99, the second network device receives the response information carrying the downlink data receiving address for the broadcast service sent by the first network device.

That is, the first network device transparently transmits the response of the RAN to the second network device.

In other words, the aforementioned acts 98 and 99 enable the second network device to receive the downlink data receiving address for the broadcast service assigned by the RAN node.

It should be pointed out that the message interaction between SMF and RAN may be transparent to AMF, that is, AMF does not need to interpret this information content, but is only responsible for forwarding.

Alternatively, the process of act 95 may be implemented after completion of the aforementioned act 99, in which the address information of the downlink data reception channel assigned by the RAN is carried.

Figure 10:
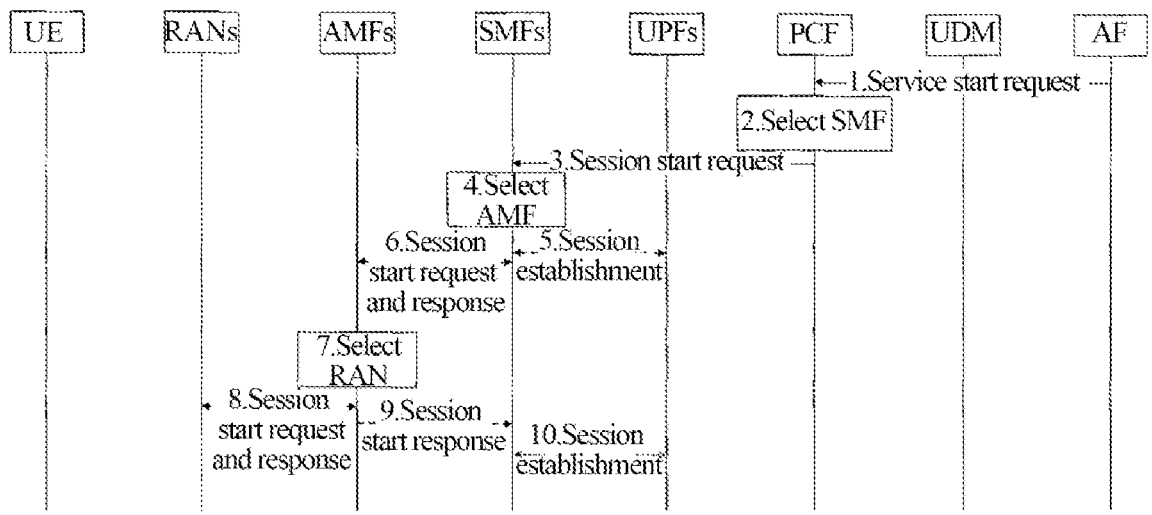

One example is shown in FIG. 10, which includes: 1) a third party server (AF) sends a broadcast service start request to the PCF; 2) PCF determines a session service according to the information related to the broadcast service, which includes selecting SMF according to area information; 3) the PCF sends a session start request to the selected SMF; 4) SMF carries out session service determination processing, including AMF selection, wherein the SMF may also select an appropriate UPF; 5) SMF sends a session establishment request to UPF; 6) SMF sends a session establishment request/response to AMF, which may carry information related to the broadcast service; 7) AMF selects an appropriate RAN after receiving the request; 8) AMF sends a session startup request/response to the RAN, with the N3 channel downlink data transmission address for performing the broadcast service by the RAN; 8-10) AMF transmits the session start response fed back by RAN to SMF, and then SMF notifies UPF of session establishment.

It can be seen that, by adopting the above solution, a first network device and a second network device may request a RAN node to establish an N3 channel downlink data receiving address corresponding to a broadcast service when the broadcast service needs to be established. In this way, the control of the start and/or modification of broadcast session in a new network architecture is achieved.

Figure 11:
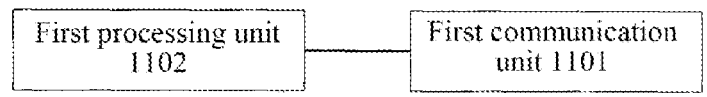
FIG. 11 is a schematic diagram of a composition of a first network device according to an implementation of the present disclosure.

An implementation of the present disclosure provides a first network device. As shown in FIG. 11, the network device includes a first communication unit 1101, configured to receive a first request carrying information related to a broadcast service, wherein the first request is used for indicating to establish a session corresponding to the broadcast service, or is used for modifying a session corresponding to the broadcast service, and send a second request carrying the information related to the broadcast service to a second network device, wherein the second request is used by the second network device for establishing a session corresponding to the broadcast service or is used for modifying a session corresponding to the broadcast service.

Figure 12:
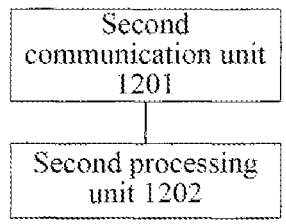
FIG. 12 is a schematic diagram of a composition of a second network device according to an implementation of the present disclosure.

In the second network device, as shown in FIG. 12, a second communication unit 1201 it is included, configured to receive a second request carrying information related to the broadcast service sent by the first network device, wherein the second request is used by the second network device for establishing a session corresponding to the broadcast service through a Radio Access Network (RAN) or is used for modifying a session corresponding to the broadcast service; and send a third request carrying information related to the broadcast service to the RAN node, wherein, the third request is used for requesting to establish a context corresponding to the broadcast service.

Figure 13:
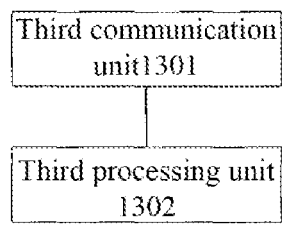
FIG. 13 is a schematic diagram of a composition of a third network device according to an implementation of the present disclosure.

Accordingly, as shown in FIG. 13, a third network device includes: a third communication unit 1301, configured to send a first request carrying information related to a broadcast service to the first network device or the second network device, wherein the first request is used for establishing a session corresponding to the broadcast service or is used for modifying a session corresponding to the broadcast service.

In the implementation, the first network device may be an Access and Mobility Management Function (AMF), the second network device may be a Session Management Function (SMF), the third network device may be a Policy Control Function (PCF), and the fourth network device may be a User Plane Function (UPF).

Of course, the third network device may be other devices as long as it can accept instructions for starting the broadcast service from a third party application service AF and can send a first request to the first network device or the second network device to establish or modify a session corresponding to the broadcast service, that is, within the protection scope of the solution provided by the present implementation. In addition, the fourth network device is not limited to UPF.

Generally speaking, the solution provided by this implementation is that the MBS session is started by a network side. The network side determines the area of the broadcast service and the information related to the session, and notifies the RAN side. A first network device (e.g. an AMF) is first selected through a third network device (e.g. a PCF), and a corresponding second network device, i.e. an SMF network entity, is selected through the first network device, i.e. an AMF.

The information related to a broadcast service includes at least one of the following:
identification information of the broadcast service, area information of the broadcast service, quality requirement information of the broadcast service, group information of data corresponding to the broadcast service, Data Network Name (DNN) information corresponding to the broadcast service, and network slice information corresponding to the broadcast service.

A third party application server (AF) initiates a broadcast service start request, and the AF sends the broadcast service start request to a third communication unit of a third network device.

Correspondingly, the third communication unit of the third network device receives a broadcast service start request carrying the information related to the broadcast service sent by a third party application server.

The third network device further includes a third processing unit 1302, which selects a first network device or a second network device according to the information related to the broadcast service and a sixth preset condition.

The sixth preset condition includes at least one of the following:
the first network device or the second network device corresponding to the area information of the broadcast service is selected;
the first network device or the second network device corresponding to the identification information of the broadcast service is selected based on a correspondence relationship between the broadcast service and a configured network entity;
the first network device or the second network device corresponding to the group information of the broadcast service is selected;
the first network device or the second network device capable of supporting the quality requirement information of the broadcast service is selected; and
the first network device or the second network device capable of supporting DNN information and/or network slice information of the broadcast service is selected.

The third communication unit 1301 of the third network device sends a first request carrying information related to the broadcast service to the first network device; wherein the first request is used for establishing a session corresponding to the broadcast service or is used for modifying a session corresponding to the broadcast service.

The first communication unit 1101 of the first network device sends a second request carrying information related to the broadcast service to the second network device; wherein the second request is used by the second network device for establishing a session corresponding to the broadcast service or modifying a session corresponding to the broadcast service.

If the related network entity determined by the PCF only includes AMF (i.e. the first network device), the first network device is further used for selecting a corresponding second network device (i.e. SMF) according to the information related to the broadcast service and the first preset condition through the first processing unit 1102.

The first preset condition includes at least one of:
the second network device corresponding to the area information of the broadcast service is selected;
the second network device corresponding to the identification information of the broadcast service is selected based on a correspondence relationship between the broadcast service and a configured network entity;
the second network device corresponding to the group information of the broadcast service is selected;
the second network device capable of supporting the quality requirement information of the broadcast service is selected; and
the second network device capable of supporting DNN information and/or network slice information of the broadcast service is selected.

The specific processing of the first preset condition is the same as the specific processing in Act 52 and will not be described here.

Or, the third processing element of the third network device (i.e. PCF) may directly select the SMF, i.e. the second network device, then the first network device may receive the indication information corresponding to the second network device from the third network device. That is, the PCF may indicate to the AMF an entity related to the selected broadcast service. A specific way may be the way of determining AMF/SMF network entities by the PCF.

Specifically, if the second request carries DNN information and/or network slice information, the AMF needs to consider the DNN and/or the network slice information corresponding to the broadcast service when selecting the SMF.

The first processing unit 1102 of the first network device selects the RAN node according to the information related to the broadcast service and a second preset condition.

The first communication unit of the first network device notifies the selected RAN node to the second network device.

Here, the specific second preset condition may include at least one of the following:
the RAN node corresponding to the area information of the broadcast service is selected;
the RAN node corresponding to the identification information of the broadcast service is selected according to the correspondence relationship between the broadcast service and a configured network entity;
the RAN node corresponding to the group information of the broadcast service is selected;
the RAN node capable of supporting the quality requirement information of the broadcast service is selected; and
the RAN node capable of supporting DNN information and/or network slice information of the broadcast service is selected.

The aforementioned second preset condition will not be repeated here.

A second communication unit of the second network device receives a second request carrying information related to the broadcast service sent by the first network device and sends a third request carrying the information related to a broadcast service to the RAN node; wherein, the third request is used for requesting to establish the context corresponding to the broadcast service.

The context corresponding to the broadcast service includes at least one of the following:
an N3 channel downlink data receiving address and Quality of Service (QoS) parameter information.

In this act, the second processing unit 1202 of the second network device selects the RAN node and/or a fourth network device according to the information related to the broadcast service and a third preset condition; or, the second communication unit of the second network device receives the selected RAN node sent from the first network device.

The third preset condition includes at least one of the following:
the RAN node and/or the fourth network device corresponding to the area information of the broadcast service is selected;
the RAN node and/or the fourth network device corresponding to the identification information of the broadcast service is selected based on the correspondence relationship between the broadcast service and a configured network entity;
the RAN node and/or the fourth network device corresponding to the group information of the broadcast service is selected;
the RAN node and/or the fourth network device capable of supporting the quality requirement information of the broadcast service is selected; and
the RAN node and/or the fourth network device capable of supporting DNN information and/or network slice information of the broadcast service is selected.

The second communication unit 1201 of the second network device sends a fourth request to the fourth network device, wherein the fourth request is used for requesting the fourth network device to carry out QoS processing on the downlink data corresponding to the broadcast service.

The second communication unit 1201 of the second network device sends the N3 channel downlink data receiving address of the broadcast service to the fourth network device.

In an implementation of the present disclosure, a second network device is further provided, which includes: a second communication unit, configured to receive a first request carrying information related to a broadcast service; wherein the first request is used for establishing a session corresponding to the broadcast service or is used for modifying a session corresponding to the broadcast service; and send a fifth request carrying the information related to the broadcast service to a Radio Access Network (RAN) node of through the first network device; wherein the fifth request is used for requesting the RAN node to establish a context corresponding to the broadcast service.

In an implementation of the present disclosure, a first network device is further provided, which includes: a first communication unit, configured to receive a fifth request carrying information related to a broadcast service sent by a second network device, wherein the fifth request is used for requesting a RAN node to establish a context corresponding to the broadcast service; and send the fifth request to the RAN node.

Correspondingly, a third network device includes: a third communication unit, configured to send a first request carrying information related to a broadcast service to a first network device or a second network device, wherein the first request is used for establishing a session corresponding to the broadcast service or is used for modifying a session corresponding to the broadcast service.

The present implementation differs from the previous implementation in that a third network device directly selects a second network device, that is, the PCF directly selects the SMF in the MBS session start/modification process. The MBS session is started by the network side. The network side determines information related to the area and the session of the broadcast service, and notifies the RAN side. PCF selects an SMF network entity.

The context corresponding to the broadcast service includes at least one of the following:
an N3 channel downlink data receiving address and Quality of Service (QoS) parameter information.

In addition, the information related to the broadcast service is the same as that of the previous implementation, and will not be described here.

The present implementation focuses on that a third network device (i.e. PCF) can select a second network device (i.e. SMF).

The third communication unit 1301 of the third network sends a first request carrying information related to the broadcast service to the second network device; wherein the first request is used for establishing a session corresponding to the broadcast service or is used for modifying a session corresponding to the broadcast service.

Accordingly, a second communication unit 1201 of the second network device receives the first request carrying information related to the broadcast service.

The second processing unit of the second network device selects a corresponding first network device according to the information related to the broadcast service and a fourth preset condition.

The fourth preset condition includes at least one of the following:
the first network device corresponding to the area information of the broadcast service is selected;
the first network device corresponding to the identification information of the broadcast service is selected based on a correspondence relationship between the broadcast service and a configured network entity;
the first network device corresponding to the group information of the broadcast service is selected;
the first network device capable of supporting the quality requirement information of the broadcast service is selected; and
the first network device capable of supporting DNN information and/or network slice information of the broadcast service is selected.

The second processing unit of the second network device selects the RAN node and/or a fourth network device according to the information related to the broadcast service and a third preset condition; and the second network device notifies the selected RAN node and/or the fourth network to the first network device.

The third preset condition includes at least one of the following:
the RAN node and/or the fourth network device corresponding to the area information of the broadcast service is selected;
the RAN node and/or the fourth network device corresponding to the identification information of the broadcast service is selected based on a correspondence relationship between the broadcast service and a configured network entity;
the RAN node and/or the fourth network device corresponding to the group information of the broadcast service is selected;
the RAN node and/or the fourth network device capable of supporting the quality requirement information of the broadcast service is selected; and
the RAN node and/or the fourth network device capable of supporting DNN information and/or network slice information of the broadcast service is selected.

In addition, the SMF may also determine the UPF related to the broadcast service.

The second communication unit of the second network device sends the Quality of Service (QoS) information corresponding to the broadcast service to the fourth network device.

The second communication unit of the second network device sends a fifth request carrying the information related to the broadcast service to a radio access network (RAN) node through the first network device; wherein the fifth request is used for requesting the RAN node to assign the N3 channel downlink data receiving address corresponding to the broadcast service.

The second communication unit of the second network device sends a fifth request carrying information related to the broadcast service to the first network device.

In addition, when the first network device receives the fifth request, the first network device receives the information of the RAN node and/or the fourth network device sent by the second network device; or, the first processing unit 1102 of the first network device selects the corresponding RAN node according to the information related to the broadcast service and a fifth preset condition.

The fifth preset condition includes at least one of the following:
the RAN node corresponding to the area information of the broadcast service is selected;
the RAN node corresponding to the identification information of the broadcast service is selected according to the correspondence relationship between the broadcast service and a configured network entity;
the RAN node corresponding to the group information of the broadcast service is selected;
the RAN node capable of supporting the quality requirement information of the broadcast service is selected; and
the RAN node capable of supporting DNN information and/or network slice information of the broadcast service is selected.

The first communication unit of the first network device sends the fifth requests to the RAN node.

The second communication unit of the second communication unit receives response information carrying the downlink data receiving address for the broadcast service sent by the first network device.

It can be seen that, by adopting the above solution, a first network device and a second network device may request a RAN node to establish an N3 channel downlink data receiving address corresponding to the broadcast service when the broadcast service needs to be established. In this way, the control of the start and/or modification of broadcast sessions in the new network architecture is achieved.

Figure 14:
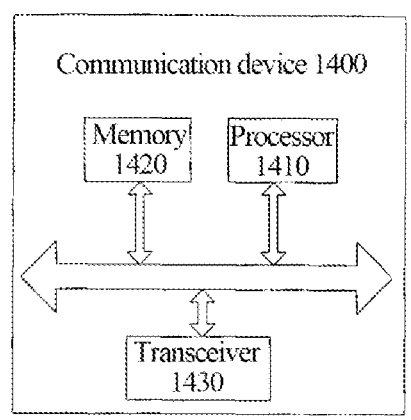
FIG. 14 is a schematic diagram of a composition of a communication device according to an implementation of the present disclosure.

FIG. 14 is a structure of a communication device according to an implementation of the present disclosure, which may be used as a schematic structure diagram of any of the foregoing network devices, and the device may be the foregoing terminal device in this implementation. The network device shown in FIG. 14 includes a processor 1410. The processor 1410 may call and run a computer program from a memory to implement the method in implementations of the present disclosure.

Optionally, as shown in FIG. 14, a memory 1420 may be further included. The processor 1410 may invoke and run a computer program from the memory 1420 to implement the method in the implementations of the present disclosure.

Herein, the memory 1420 may be a separate device independent of the processor 1410, or may be integrated in the processor 1410.

Optionally, as shown in FIG. 14, the communication device 1400, which is a terminal, may further include a transceiver 1430, and the processor 1410 may control the transceiver 1430 to communicate with another device. Specifically, the transceiver 1330 may send information or data to another device or receive information or data sent by another device.

Herein, the transceiver 1430 may include a transmitter and a receiver. The transceiver 1430 may further include antennas, a quantity of which may be one or more.

Optionally, the communication device 1400 may be specifically the network device according to the implementations of the present disclosure, and the communication device 1400 may implement the corresponding processes implemented by the network device in various methods in the implementations of the present disclosure, which will not be repeated here for brevity.

Optionally, the communication device 1400 may be specifically a terminal device or a network device of an implementation of the present disclosure, and the communication device 1400 may implement the corresponding processes implemented by the mobile terminal/terminal device in various methods of the implementations of the present disclosure, which will not be repeated here again for brevity.

Figure 15:
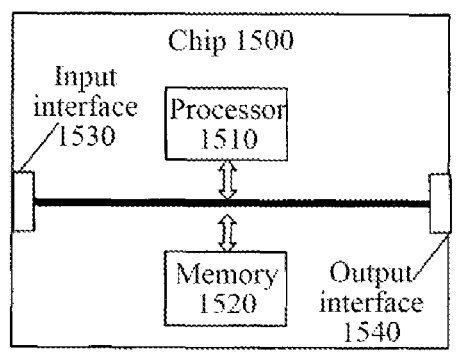
FIG. 15 is a schematic block diagram of a chip according to an implementation of the present disclosure.

FIG. 15 is a schematic diagram of a structure of a chip according to an implementation of the present disclosure. The chip 1500 shown in FIG. 15 includes a processor 1510, wherein the processor 1510 may call and run a computer program from a memory to implement the method in the implementations of the present disclosure.

Optionally, as shown in FIG. 15, the chip 1500 may further include a memory 1520. The processor 1510 may invoke and run a computer program from the memory 1520 to implement the method in the implementation of the present disclosure.

Herein, the memory 1520 may be a separate component independent of the processor 1510, or may be integrated in the processor 1510.

Optionally, the chip 1500 may further include an input interface 1530. Herein, the processor 1510 may control the input interface 1530 to communicate with another device or chip. Specifically, the processor 1410 may obtain information or data sent by another device or chip.

Optionally, the chip 1500 may further include an output interface 1540. The processor 1510 may control the output interface 1540 to communicate with another device or chip. Specifically, the processor 710 may output information or data to another device or chip.

Optionally, the chip may be applied to the network device in the implementations of the present disclosure, and the chip may implement corresponding processes implemented by the network device in the various methods in the implementations of the present disclosure, which will not be repeated here for brevity.

Optionally, the chip may be applied to the terminal device in the implementations of the present disclosure, and the chip may implement the corresponding processes implemented by the terminal device in various methods in the implementations of the present disclosure, which will not be repeated here again for brevity.

It should be understood that the chip mentioned in the implementations of the present disclosure may also be referred to as a system-level chip, a system chip, a chip system, or a system on chip, etc.

It should be understood that the processor in the implementations of the present disclosure may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or perform various methods, acts, and logical block diagrams disclosed in the implementations of the present disclosure. The general purpose processor may be a microprocessor, or the processor may also be any conventional processor, or the like. The acts of the methods disclosed in the implementations of the present disclosure may be directly embodied to be performed by a hardware decoding processor, or may be performed by a combination of hardware and software modules in the decoding processor. The software modules may be located in a storage medium which is mature in the art, such as a Random Access Memory, a flash memory, a Read Only Memory, a Programmable Read Only Memory, or an electrically erasable programmable memory, or a register. The storage medium is located in a memory, and the processor reads information in the memory and completes the acts of the above methods in combination with its hardware.

It should be understood that the memory in the implementations of the present disclosure may be a transitory memory or a non-transitory memory, or may include both transitory memory and non-transitory memory. The non-transitory memory may be a Read Only Memory (ROM), a Programmable Read Only Memory (PROM), an Erasable Programmable Read Only Memory (EPROM), an Electrically Erasable Programmable Read Only Memory (EEPROM), or a flash memory. The transitory memory may be a Random Access Memory (RAM), which is used as an external cache. As an example, but not as a restriction, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the implementations of the present disclosure may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the implementations of the present disclosure are intended to include, but are not limited to, these and any other suitable types of memories.

An implementation of the present disclosure further provides a computer readable storage medium configured to store a computer program.

Optionally, the computer readable storage medium may be applied to a network device in an implementation of the present disclosure, and the computer program enables a computer to perform the corresponding processes implemented by the network device in various methods according to the implementations of the present disclosure, which will not be repeated here for brevity.

Optionally, the computer readable storage medium may be applied to a terminal device in an implementation of the present disclosure, and the computer program enables a computer to perform the corresponding processes implemented by the mobile terminal/terminal device in various methods of the implementations of the present disclosure, which will not be repeated here for brevity.

An implementation of the present disclosure further provides a computer program product, including computer program instructions.

Optionally, the computer program product may be applied to the network device in an implementation of the present disclosure, and the computer program instructions enable a computer to perform the corresponding processes implemented by the network device in various methods according to the implementations of the present disclosure, which will not be repeated here for brevity.

Optionally, the computer program product may be applied to the mobile terminal/terminal device in the implementations of the present disclosure, and the computer program instructions enable a computer to perform the corresponding processes implemented by the mobile terminal/terminal device in various methods according to the implementations of the present disclosure, which will not be repeated here for brevity.

An implementation of the present disclosure further provides a computer program.

Optionally, the computer program may be applied to the network device in an implementation of the present disclosure. When the computer program is run on a computer, the computer is enabled to perform the corresponding processes implemented by the network device in various methods according to the implementations of the present disclosure, which will not be repeated here for brevity.

Optionally, the computer program may be applied to the mobile terminal/terminal device in the implementations of the present disclosure. When the computer program is run on a computer, the computer is enabled to perform the corresponding processes implemented by the mobile terminal/terminal device in various methods according to the implementations of the present disclosure, which will not be repeated here for brevity.

Those of ordinary skill in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Skilled in the art may use different methods to implement the described functions for each particular application, but such implementation should not be considered to be beyond the scope of the present disclosure.

The functions may be stored in a computer readable storage medium if implemented in a form of a software functional unit and sold or used as a separate product. Based on this understanding, technical solutions of the present disclosure, in essence, or a part contributing to the existing art, or part of the technical solutions, may be embodied in a form of a software product stored in a storage medium, including several instructions for enabling a computer device (which may be a personal computer, a server, or a network device, etc.) to perform all or part of the acts of the methods described in various implementations of the present disclosure. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure should be subject to the protection scope of the claims.

What is claimed is:

1. A method for establishing a broadcast service, comprising:
   receiving, by an AMF, a fifth request sent by an SMF carrying information related to a broadcast service, wherein the fifth request is used for requesting a RAN node to establish a context corresponding to the broadcast service; and
   sending, by the AMF, the fifth request to the RAN node; wherein the method further comprises:
   selecting, by the AMF, a corresponding RAN node according to the information related to the broadcast service and a fifth preset condition; wherein the fifth preset condition comprises:
   the RAN node corresponding to area information of the broadcast service is selected; wherein the information related to the broadcast service comprises at least one of the following:
   identification information of the broadcast service, area information of the broadcast service, or quality requirement information of the broadcast service.

2. The method of claim 1, wherein the information related to the broadcast service further comprises at least one of the following:
   group information of data corresponding to the broadcast service, DNN information corresponding to the broadcast service, or network slice information corresponding to the broadcast service.

3. The method of claim 1, wherein the context corresponding to the broadcast service comprises at least one of the following:
   an N3 channel downlink data receiving address or Quality of Service (QOS) parameter information.

4. The method of claim 1, wherein the AMF transparently transmits an N3 channel downlink data receiving address provided by the RAN node to the SMF.

5. The method of claim 1, wherein the fifth preset condition further comprises at least one of:
   the RAN node corresponding to identification information of the broadcast service is selected according to a correspondence relationship between the broadcast service and a configured network entity;
   the RAN node corresponding to group information of the broadcast service is selected;
   the RAN node capable of supporting quality requirement information of the broadcast service is selected; or
   the RAN node capable of supporting DNN information and/or network slice information of the broadcast service is selected.

6. A first network device, comprising: a processor and a transceiver, wherein
the transceiver is configured to receive a fifth request carrying information related to a broadcast service sent by an SMF, wherein the fifth request is used for requesting a RAN node to establish a context corresponding to the broadcast service; and send the fifth request to the RAN node; wherein the processor is configured to select a corresponding RAN node according to the information related to the broadcast service and a fifth preset condition; wherein the fifth preset condition comprises:
the RAN node corresponding to area information of the broadcast service is selected; wherein the first network device is an AMF; wherein the information related to the broadcast service comprises at least one of the following:
identification information of the broadcast service, area information of the broadcast service, or quality requirement information of the broadcast service.

7. The first network device of claim 6, wherein the information related to the broadcast service further comprises at least one of the following:
group information of data corresponding to the broadcast service, DNN information corresponding to the broadcast service, or network slice information corresponding to the broadcast service.

8. The first network device of claim 6, wherein the context corresponding to the broadcast service comprises at least one of the following:
an N3 channel downlink data receiving address or Quality of Service (QOS) parameter information.

9. The AMF of claim 6, wherein the AMF transparently transmits an N3 channel downlink data receiving address provided by the RAN node to the SMF.

10. The first network device of claim 6, wherein the fifth preset condition further comprises at least one of:
the RAN node corresponding to identification information of the broadcast service is selected according to a correspondence relationship between the broadcast service and a configured network entity;
the RAN node corresponding to group information of the broadcast service is selected;
the RAN node capable of supporting quality requirement information of the broadcast service is selected; or
the RAN node capable of supporting DNN information and/or network slice information of the broadcast service is selected.

* * * * *